United States Patent [19]

Graham et al.

[11] Patent Number: 5,698,044
[45] Date of Patent: *Dec. 16, 1997

[54] REMOVAL OF ADHESIVE FROM POLYESTER FILM WITH CRITICALITY IN SURFACTANT USE

[75] Inventors: William Edward Graham; Richard Roy Marriott Jones, both of Hendersonville, N.C.

[73] Assignee: E. I. Du Pont de Nemours and Company, Wilmington, Del.

[*] Notice: The term of this patent shall not extend beyond the expiration date of Pat. No. 5,628,832.

[21] Appl. No.: 527,300

[22] Filed: Sep. 12, 1995

Related U.S. Application Data

[63] Continuation-in-part of Ser. No. 410,171, Mar. 24, 1995, Pat. No. 5,628,832.

[51] Int. Cl.[6] .................... B08B 3/08; C08J 11/04
[52] U.S. Cl. .................... 134/10; 134/29; 521/40; 521/48
[58] Field of Search .................... 134/10, 13, 15, 134/29; 521/22.17, 40, 48

[56] References Cited

U.S. PATENT DOCUMENTS

| | | | |
|---|---|---|---|
| 3,928,253 | 12/1975 | Thornton et al. | 134/10 |
| 4,602,046 | 7/1986 | Bauser et al. | 521/46 |
| 4,612,057 | 9/1986 | Bauser et al. | 134/29 X |
| 4,799,954 | 1/1989 | Hochberg | 75/118 |
| 5,055,139 | 10/1991 | Personette | 134/22.17 |
| 5,127,958 | 7/1992 | Personette | 134/29 X |
| 5,286,463 | 2/1994 | Schwartz, Jr. | 423/23 |
| 5,366,998 | 11/1994 | Schwartz, Jr. | 521/40 |

*Primary Examiner*—Robert J. Warden
*Assistant Examiner*—Saeed Chaudhry

[57] ABSTRACT

Coating is removed from polyester film which is formed into flakes by use of an alkali stripping solution containing surfactant wherein the surfactant is not optimized in a stripping step to remove redeposited coating but rather is optimized to aid in rinsing based on residual surfactant present on the stripped flake.

8 Claims, No Drawings

REMOVAL OF ADHESIVE FROM POLYESTER FILM WITH CRITICALITY IN SURFACTANT USE

The present patent application is a continuation-in-part of Ser. No. 08/410,171 filed Mar. 24, 1995, now U.S. Pat. No. 5,628,832.

BACKGROUND OF THE INVENTION

The present invention is directed to a process for recovery of polyester film by stripping coated polyester film wherein the stripped film is of sufficient quality to recycle as a feedstock such as for direct extrusion.

Polyester film is conventionally used as a self-supporting substrate for coatings in diverse applications including photographic films, flexible packaging, and magnetic media. Photographic films utilize an adhesive coating layer to provide adhesion of a light-sensitive emulsion layer, typically a silver halide dispersed in gelatin, to the polyester film since the gelatin does not adhere well to the uncoated polyester surface. Typical adhesive coating layers used in photographic films include polyvinylidene chloride or acrylic copolymers containing acrylonitrile or vinylidene chloride.

It is desirable to strip the coating layers from discarded coated polyester films to minimize solid waste disposal and recover polyester and, in the case of x-ray and photographic films, silver constituents for recycling. Various methods have been employed to recover the silver and the polyester film from both undeveloped ("green") and developed ("black") photographic film as well as polyester film from non-silver-containing coated film. The photographic emulsion layer can be readily stripped from the underlying adhesive coating layer on the polyester film simply by subjecting the film to hot water and then the adhesive coating layer can subsequently be removed, for example, by dissolution in appropriate glycol solvents or by stripping in an aqueous alkaline stripping solution. Alternatively, the emulsion and adhesive coating layers can be stripped simultaneously, for example, by mixing the chopped photographic film flake in a hot aqueous alkaline stripping solution under high shear as described in U.S. Pat. No. 4,799,954 by Hochberg.

The prior art teaches incorporation of specific salts and surfactants in aqueous alkaline stripping solutions to disperse solid residue resulting from coating layers stripped from the polyester film. Personnette in U.S. Pat. No. 5,055,139 issued Oct. 8, 1991, teaches the use of a combination of at least 0.75 wt % trisodium phosphate and at least 0.75 wt % of alkali metal hydroxide to strip polymeric coatings from polyester substrates with recycle of the stripping solution after filtration to remove suspended coating solids. Schwartz in U.S. Pat. No. 5,286,463 issued Feb. 15, 1994, teaches a process for stripping photographic films with aqueous alkaline stripping compositions which include wetting agents, rinse aids, emulsifiers and a reducing sugar to prevent deposition of particles formed from the adhesive coating layer on the cleaned polyester film followed by neutralization of the stripping solution before flake separation and rinsing.

SUMMARY OF THE INVENTION

The present invention is directed to a process for removal of an adhesive coating layer from polyester film comprising the steps of:

(a) forming coated polyester film into a series of flakes, (b) contacting the flakes with an aqueous alkaline stripping solution (i) having a pH of at least 12 and (ii) comprising a surfactant whereby the adhesive coating is removed from the polyester to obtain stripped polyester flake, (c) separating undissolved solids from step (b) to recover separately stripped polyester flake and a slurry comprising stripped solution, surfactant and a dispersed solid residue resulting from the adhesive coating layer(s)

with the proviso that the stripped separated polyester flake has surface contamination of at least 360 parts per million by weight of the contaminate and stripped dry flake and with the further proviso that stripped polyester flake if rinsed in six rinse steps in accordance with test method A results in a polyester flake having a surface contamination of not greater than 28 parts per million based on the weight of the contaminate and stripped dry polyester flake, (d) rinsing the stripped polyester flake from step (c) with an aqueous rinse stream, whereby the flake has surface contamination of not greater than 36 parts per million based on the weight of the contaminate and stripped dry polyester flake.

Alternatively, the process in step (d) is employed whereby the flake has surface contamination of not greater than 28 parts per million by weight.

In further embodiments of the invention, the process includes the added steps of:

(e) separating the slurry into a clarified liquid and a concentrate, and (f) repeating step (a) through step (d) on additional flake with at least a portion of the clarified liquid from step (e) recycled into step (b).

Alternatively, the process may include repeating steps (a) through (d) on additional flake with at least a portion of the slurry recovered from step (c) recycled into step (b).

Alternatively, the process may include the addition of additional alkali to the slurry prior to step (e). Also, surfactant and/or alkali may be added to the aqueous rinse of step (d) to reduce the amount of rinse water required or to improve the quality of the rinsed flake.

DETAILED DESCRIPTION

It is conventional to coat polyester film wherein a coated layer provides the primary functional properties for an end use. The polyester film serves as a substrate in providing strength and dimensional stability. One or more coating layers are adhered to the polyester film through an adhesive layer (also conventionally called a subbing layer). The polyester film together with the adhesive layer (with or without additional coating layers) represents the starting material for use in the present invention.

The type of polyester film useful herein is not critical and typically is of commercially available material with polyethylene terephthalate and polyethylene napthalate being preferred. It is understood that comonomers can be included in these preferred polyesters e.g., up to 20% by weight additional comonomers such as aliphatic glycols and aromatic diacyl chlorides, anhydrides, or their esters.

The sole requirement for the adhesive layer which contacts the polyester film is to bond a further coating layer. Adhesive layers with ability for polyester bonding are well known in the art. Typical adhesive coatings include polyvinylidene chloride homopolymers and acrylic terpolymers such as those containing itaconic acid, ethyl acrylate and vinylidene chloride. The present invention is directed to removal of the adhesive from the polyester such that the polyester can be recycled for further use.

However, it is within the scope of the present invention that one or more additional layers are present in addition to the adhesive. Typically, one or more additional layers will be present such as developed and undeveloped photosensitive emulsions. It is understood that each of the coating layers may be composed of several polymers, including gelatin, and additives including but not limited to antistatic agents, sensitizers, stabilizers, and fillers including, in the case of photographic emulsion layers, silver halide or silver particles for photographic film that is undeveloped or developed, respectively.

Therefore, in a conventional mode, the starting material will include at least three distinct layers; namely, the base polyester film, the adhesive coating, and a further layer which introduces functional properties, e.g., in the case of X-ray film a silver halide and/or silver containing layer.

An initial step in the present invention is to increase the surface area at the edges of the coating polyester film to aid in the ability of a stripping solution to separate the polyester film from an adhesive. Therefore, the coated polyester film is formed into smaller particles, called flake herein, such as by chopping or grinding. The size of flake is not critical although preferred particle sizes may be present in a commercial mode such as for ease of handling or agitation in stripping. As shown in the examples suitable flake sizes pass through mesh screening containing one-half or three quarters inch openings.

Thereafter the coated polyester flake which contains adhesive adjacent to the polyester is contacted with aqueous alkaline stripping solution which contains a surfactant. For purposes of the present invention the pH of the stripping solution is critical. A pH of at least 12 with a typical range from 12 to 13.5 is employed. Suitable alkalinity is imparted from, e.g., hydroxide ion with preferred alkalis including sodium hydroxide and potassium hydroxide. The high pH of the stripping solution is believed to aid in the attack of the stripping solution at the interface of the polyester and adhesive.

Although the stripping solution need not be heated, it is preferable that elevated temperature be employed, e.g., in a range from 70° C. to 95° C. A preferred elevated temperature range is 85° C. to 95° C. Typically, agitation is employed during stripping.

It is required in the present invention that the stripping solution contain a surfactant or surfactant mixture. The preferred surfactant or surfactant mixture is considered to provide the following contradictory attributes. First it must stabilize a dispersion of solid particulate resulting from the detached coating. Yet at the same time this dispersion cannot be so stable as to be difficult to clarify by such methods as filtration, centrifugation, or gravitational settling. Second, it must allow clean separation of the dispersion from the flake. Yet at the same time, the separation cannot be optimal at high pH as rinse proceeds by dilution of caustic carried forward to lower pH. The present invention is based on the demonstrated existence of a pH dependence to both of these attributes.

In order to be able to reuse the highly caustic stripping solution in a subsequent batch, the dispersed solids load needs to be reduced. We have discovered that a specific hydroxide salt effect allows ready clarification of the stripping slurry. The nonionic and anionic surfactant compositions used are resistant to high salinity and stabilize the adhesive particle dispersion formed in the stripping bath sufficiently to allow the bulk of the solids to be removed from the flake by flowing the slurry over a screen. Hydroxide ion is particularly effective in dehydrating the nonionic surfactant causing an additional pH effect on dispersion stability over and above the typical salt effect of similarly charged ions such as chloride and bromide. At high levels of caustic, the dispersion is dramatically less stable allowing clarification by settling of the effluent in a holding tank or more rapidly by mild centrifugation as in a hydrocyclone. This attribute can be enhanced by further addition of caustic after flake separation. The preferred level of caustic in the stripping bath is 1.0 wt % sodium hydroxide based on the weight of the solution. At 0.5 wt % the dispersion is difficult to clarify while 1.5 wt % uses caustic to no additional benefit in the stripping bath but is a useful level for clarification of the stripped dispersion.

In the removal of the stripping solution from the polyester flake, inherently some of the detached adhesive particles are left adhered to the flake. We have discovered that the level of this reattached contamination depends on the surfactants chosen and the pH. If the surfactant is chosen such that the contamination is minimized at first separation of the liquid at the high pH of the stripping bath, the remaining reattached particles are difficult to remove as the pH of the rinse drops due to dilution of the stripping liquid carried forward with the wet flake. If the surfactant is chosen which minimizes the level of reattached adhesive particulate at a lower pH, while the initial separation at high caustic level yields lower quality flake, the subsequent rinse can become more effective. However, if the pH optimum of the surfactant film drainage is below 9, rinse is again less effective as this pH is only reached late in the rinse process, requiring impractical volumes of water. Even if the stripping solution is neutralized to this pH prior to rinse, too low a pH optimum is not effective because the pH rapidly drops in the subsequent rinse to below this level. The preferred pH optimum for the surfactant combination film drainage is pH 9 to 11, the range of pH in rinse of unneutralized stripping liquid. Thus the final quality of the rinsed polyester flake is controlled in the rinse rather than by the conditions in the stripping bath.

Without being bound to theory, it is believed that an explanation can be provided which accounts for these observations and guides the proper selection of surfactant for the preferred high caustic stripping conditions and unneutralized rinse. The construction of rinse functions where the quality of polyester flake is measured as a function of total accumulated volume of rinse at different initial pH's demonstrates a pronounced minimum in the level of particulate contamination with pH. This minimum arises by a complex combination of nonionic surfactant dehydration (to high pH) which defeats so-called steric stabilization of the dispersed phase and colloid-colloid interactions (to low pH) with soluble polymer (e.g., gelatin) colloids. The nonionic surfactant is chosen to resist high saline conditions since the mechanism of colloidal stabilization by these surfactants is less effected by coulombic screening. An anionic surfactant defeats the cloud point insolubilization of the nonionic surfactant at the preferred elevated temperature allowing less soluble nonionic surfactants which are more adsorbing to be used. The breaking of the dispersion at high caustic upon settling or centrifugation is due to the dehydration of the ethylene oxide segment of the nonionic and its subsequent collapse to an attractive potential to similar phases on adjacent particles. This attractive force at high caustic leads to poorer drainage of the surfactant film and the leaving of a larger number of adhesive particles on the flake. The drop in pH which occurs in rinse restores the maximum dispersing ability of the surfactant. Further decreases in pH bring the acid-base properties of the dissolved anionic species such as gelatin and the anionic surfactant into play such that a second adsorbed layer forms on top of the nonionic surfactant layer, leading to again an attractive interparticle force and poorer rinse.

Consistent with this theory, it is considered that inherently some surfactant remains on the surface of the stripped polyester flake together with residual caustic due to the liquid carried forward with the flake at each rinse separation. This small amount of surfactant is believed to optimize the efficiency of the rinse operation. The rinse can be impacted by addition of more surfactant at this point or less obviously by pH control at rinse. As outlined above, the surfactant is considered to be pH sensitive, such that if the surfactant or surfactant combination is chosen to be optimal at the pH of the bulk of the rinse cycle, i.e., at pH 9–11, lower levels of adhered particulate can be achieved. If the surfactant or combination is optimal at a high pH such as pH 12 or above, the initial separation of flake from the dispersion of adhesive particles will be more effective but the rinse will be degraded unless high levels of caustic are maintained. These levels of caustic addition are practical only if the entire rinse is recycled forward in counter current flow of all reagents. Conversely, if the pH optimum is too low, only by buffering the rinse can the best film drainage conditions be maintained. This latter approach is entirely impractical.

In summary, the type of surfactant is critical to the present invention. A surfactant is employed which does not optimize the initial quality of stripped polyester flake obtained when the coating materials are initially completely removed from the polyester flake at high pH of 12 and above. In the removal of the coating from the flake, inherently at least some coating is redeposited onto the flake and remains when the stripped polyester flake is separated from a slurry containing stripping solution including surfactant and solids resulting from any coating layer.

Therefore, in the present invention a surfactant is chosen which leaves stripped polyester flake quality less than optimum compared to use of a surfactant which minimizes contamination of the polyester flake with redeposited coating material including adhesive when the flake and stripping solution are separated. However, the surfactants employed in the present invention are selected to maximize polyester flake quality following subsequent rinse in the pH range of 9 to 11. Again, the final flake quality is controlled in the rinse rather than in the stripping bath.

Typical surfactants which can be used in the stripping solutions of the present invention include but are not limited to combinations of anionic and nonanionic surfactants such as:

Afilan CVH, nonyl phenol polyglycol ether (Hoechst Celanese) and Sulfonate OA-5R, the sodium salt of sulfonated oleic acid (Bit Manufacturing)
Triton QS-44, octylphenoxypolyethyoxy-ethylphosphate and Triton N-111 nonylphenoxypolyethoxyethanol both available from Union Carbide
or surfactants having both nonionic and anionic functionality such as Aerosol NPES-458, the ammonium salt of sulfated nonylphenoxypoly-(ethyleneoxy) ethanol (CyTec Inc).

It is understood that the stripping solution can encompass further addition of one or more recycle streams as will be further discussed below in removal of coating from the polyester flake.

After the stripping operation to remove all or substantially all coating material from the polyester, it is required that the wet stripped polyester flake with redeposited surface contamination be separated from a slurry comprising stripping solution and solids such as suspended coating solids, fine polyester flakes and dissolved binders.

Consistent with the theory stated above, the separated wet stripped polyester flake will have a relatively gross amount of surface contamination. The weight of this contamination or redeposited coating will be at least 360 parts per million based on the weight of the dry polyester flake and the surface contamination. The concentration or weight of surface contamination can be determined by analysis. For example, if the concentration of chlorides in the adhesive coating is known, then the concentration of contamination can be determined based on elemental analysis for chlorides.

In the present invention, the surfactant must act in the stripping solution in a manner which allows a high quality flake to be obtained with minimum water rinse from the stripped polyester flake having at least 360 parts per million surface contamination.

Test Method A is employed to determine whether residual surfactant will function optimally in a rinse step. This test method employs a 100 gram sample of wet stripped polyester flake with a known amount of surface contamination. A quantity of water in an amount of 200 grams and at a temperature of 70° C. is added to the flake with agitation for three minutes. Then the polyester flake is separated from the rinse water by pouring the slurry onto a screen. This Method A is repeated six times (steps) to separate the contamination from the polyester flake. The concentration of contaminate can again be determined by analysis, such as, by elemental analysis for chlorides.

In accordance with this Test Method A it is required that after six rinse steps with clean water the stripped polyester flake has a surface contamination not greater than 28 parts per million based on weight.

However, in actual practice of the present invention the stripped polyester flake need not result in the minimum surface contamination of 28 parts per million by weight. Illustratively, recycled wash water may be used which prevents optimum removal of contaminates. However, as a practical matter the stripped flake will have a surface contamination after rinsing of not greater than 36 parts per million based on weight. Preferably the contamination is not greater than 28 parts per million based on weight.

Further embodiments are present in the present invention both in use of recycle streams and in use of a surfactant and/or alkali added to the rinse to aid rinsing of contaminates from the stripped polyester flake.

In a first embodiment the slurry which results from the stripped polyester flake is reused as a portion of the stripping solution. The slurry which contains stripping solution with surfactant together with stripped coating solids is separated into a clarified liquid and a concentrate of wet solids. Separation may be by gravity or by centrifugation. It is the clarified liquid which can be recycled into the stripping solution.

However, it is also within the scope of the present invention that the slurry can be directly recycled as a portion of the stripping solution.

Furthermore, in a further embodiment less wash water is needed in the rinsing step with use of surfactant added to the rinse water. Reducing the volume of water needed for stripping and rinsing improved the efficiency of subsequent silver recovery and waste water treatment.

To further illustrate the present invention the following examples are provided. All parts and percentages are by weight and degrees are in centigrade unless otherwise indicated.

Flake Formation of Examples

Films were ground to form flake using a Cumberland 8×12 Gran 3KN laboratory granulator equipped with a screen over the exit port. The nominal flake size corresponded to the screen mesh size through which the flake exited the grinding process. No effort was made to fractionate the flake to eliminate fines. Typical flakes passed through a ½ or ¾ inch mesh opening.

Film Grade and Silver Grade

Standards for film grading were prepared by mixing chopped film flakes with and without a polyvinylidene chloride adhesive coating. For preparation of the film standard, no removal of adhesive took place. Rather, the flakes with and without adhesive were mixed and melted to form comparative visual standards of varying concentration of adhesive using the same melting and quenching procedures for the samples set forth in the examples. The polyester film with adhesive used to prepare the film grading standards was Cronar 780B photographic polyethylene terephthalate base (DuPont, Wilmington, Del.). The gelation coating was removed by hot water treatment. The same polyester film without adhesive or gelation coatings was employed to make up the film standard.

Film standards were prepared by weighing 5 grams of dried flake into a silicone release coated aluminum weighing dish and then melting the flake on a hot plate at 350° C. for three to five minutes. The melted sample was rapidly quenched into cold water to avoid crystallization producing a transparent amorphous disk.

The concentration of adhesive coating in the standards was calculated based on the concentration of chlorides in the mixed flake. The parts per million of chlorides were determined by elemental analysis by Galbraith Laboratories, Inc., Knoxville, Tenn. The parts per million of adhesive coating was then calculated based on the knowledge that this adhesive coating was known to be 48% chloride.

The film grade and its corresponding concentration of adhesive were as follows:

| Grade Rating | Concentration of Adhesive (parts per million) |
| --- | --- |
| 0.5 | 11 |
| 1.0 | 24 |
| 1.5 | 31 |
| 2.0 | 42 |
| 2.5 | 78 |
| 3.0 | 135 |
| 3.5 | 208 |
| 4.0 | 260 |
| 4.5 | 322 |
| 5.0 | 395 |
| 6.0 | 489 |
| 7.0 | 593 |

For purposes of the examples, a visual determination was made to determine film grade. A test sample was prepared by melting the flake and then compared with the appropriate film grade standard disk viewed under a microscope at 20× magnification with transmitted light. The polyvinylidene chloride polymer adhesive became dark red due to the temperature used to melt the flake and thus was easily distinguished from the clear background of the polyethylene terephthalate amorphous base. The adhesive coating which had not been stripped from the polyester film base of the standards had a diffuse red appearance. The film grades given in the examples are based on the overall color concentration and number of red regions per area compared to the film grade standards.

In the examples, a visual approximation was also employed to determine "silver grade" for samples of stripped and rinsed film flake with silver and/or silver halide (present as a contaminate resulting from an additional stripped photographic coating layer) in addition to the polyvinylidene chloride adhesive.

Silver and silver halide particles were black in transmitted light and could be distinguished from red areas of the polyvinyl chloride adhesive. However, for "silver grade" this difference in color was ignored and samples containing silver or silver halide were visually compared to the standard samples with only adhesive to obtain a rating.

In the following examples, the conditions of the stripping procedure were chosen so that all coating was removed from the base film. Therefore, any coating material present on the base film after stripping was from redeposition and represented surface contamination.

In the examples, the following nomenslature is employed.

NR—stands for not rinsed

R—followed by a number stands for the number of rinse steps, e.g., R1—represents one rinse step

EXAMPLE 1

The effect of adjusting the pH of the stripping solution prior to separation of the flake on the rinse efficiency and resultant flake quality was determined.

An adhesive coating layer was stripped from 500 gms of 0.75 inch maximum diameter flake from DuPont UVL film (exposed and processed to an optical density of 1.0) by stirring the coated flake for 30 minutes at 92° C. to 93° C. in 2 liters of 1.5 wt % sodium hydroxide aqueous stripping solution (16.5 wt % flake loading). The types and concentration of surfactants added to the stripping solution are given at the top of the table below. The effect of pH on surfactant rinse efficiency was examined by neutralizing the stripping solution with sulfuric acid to the indicated pH prior to rinse. The volumes of water used to rinse the flake under agitation at 70° C. in the rinse steps were R1=1.2 liters, R2=1.1 liters and R3 to R6 each employed 1.0 liters of water.

The film grade and silver grade of the flake was presented in the tables as a function of rinse.

Surfactant: 0.1 wt % Afilan CVH and 0.1 wt % Sulfonate OA-SR

| pH | grade | NR | R1 | R2 | R3 | R4 | R5 | R6 |
| --- | --- | --- | --- | --- | --- | --- | --- | --- |
| 13.4 | film | 5.0 | 2.5 | 2.0 | 1.5 | 1.5 | 1.5 | 1.0 |
| | silver | 6.0 | 3.0 | 1.5 | 1.0 | 0.5 | 0.5 | 0.5 |
| 13.1 | film | 4.0 | 3.0 | 2.0 | 2.0 | 1.5 | 1.0 | 1.0 |
| | silver | 5.0 | 2.0 | 1.0 | 0.5 | 0.5 | 0 | 0 |
| 10.3 | film | 5.0 | 3.0 | 2.0 | 2.0 | 2.0 | 1.5 | 1.5 |
| | silver | 5.0 | 3.0 | 1.5 | 1.0 | 1.0 | 1.0 | 1.0 |
| 9.1 | film | 5.0 | 3.5 | 2.0 | 2.0 | 2.0 | 1.5 | 1.5 |
| | silver | 6.0 | 3.5 | 1.5 | 1.0 | 1.0 | 1.5 | 1.0 |
| 6.5 | film | 6.0 | 3.0 | 2.0 | 2.0 | 2.0 | 2.0 | 1.5 |
| | silver | 6.0 | 4.0 | 2.0 | 1.5 | 1.5 | 1.5 | 1.5 |
| 5.5 | film | 6.0 | 3.0 | 2.0 | 2.0 | 2.0 | 2.0 | 1.5 |
| | silver | 7.0 | 4.0 | 2.5 | 2.0 | 1.5 | 1.5 | 1.5 |
| 3.1 | film | 7.0 | 3.0 | 3.0 | 2.0 | 2.0 | 2.0 | 2.0 |
| | silver | 7.0 | 5.0 | 3.0 | 2.0 | 2.0 | 1.5 | 1.5 |

Rinsing produced a film grade of less than 2.0 over almost the full breadth of starting pH. Enhanced rinse efficiency was observed over the pH range between pH 13.4 and pH 9 with a film grade of 1.0 being attained with the stripping solution at pH of about 13. Neutralization of the stripping solution to pH 10.3 or less prior to separation of the flake lowered rinse effectiveness resulting in a film grade of 1.5 or higher after six rinse steps. The rinse efficiency to reach a film grade of 1.0 with the fewest number of rinses was best when the stripping solution was at a pH of about 13 which allows the rinse pH to decrease gradually during successive rinse steps remaining above a pH 8 due to dilution of the residual stripping solution carried over on the flake after draining. It was estimated that approximately 20% of the rinse volume was retained on the drained flake based on a decrease of approximately 0.8 pH units per rinse cycle.

EXAMPLE 2

The pH dependence of rinse efficiency and flake quality as a function of the surfactants used in the stripping solution was determined for stripped flake from DuPont Cronar 780B base film.

The adhesive coating was stripped from 400 gms of 0.75 inch maximum ground flake for 30 minutes at 92° C. to 93° C. using 2 liters of 0.5 wt % sodium hydroxide and surfactants as indicated in the tables as a stripping solution (16.5 wt % solids loading). The effect of pH on surfactant rinse efficiency was examined by neutralizing the stripping solution with sulfuric acid to the indicated pH prior to rinse. Rinses R1 to R6 each employed 1.0 liter of water at 70° C.

Stripping Solution 1

Surfactant: 0.1 wt % Afilan CVH and 0.1 wt % Sulfonate OA-5R

| | | | Rinse | | | | | | |
|---|---|---|---|---|---|---|---|---|---|
| Sample | pH | Grade | NR | R1 | R2 | R3 | R4 | R5 | R6 |
| A | 12.7 | film | 5.0 | 3.5 | 2.5 | 2.0 | 1.5 | 1.0 | 1.0 |
| B | 10.8 | film | 5.0 | 3.0 | 2.5 | 2.0 | 1.5 | 1.5 | 1.0 |
| C | 8.5 | film | 5.0 | 3.0 | 2.5 | 2.0 | 1.5 | 1.5 | 1.0 |
| D | 6.0 | film | 5.0 | 3.5 | 2.5 | 2.0 | 1.5 | 1.5 | 1.5 |

Samples A through D of the present invention showed performance to film grade 1 within six rinse cycles for pH 9 and above. Rinse efficiency to reach a film grade of 1.0 was better for the unneutralized stripping solution (sample A). The rate of clarification of the stripping slurry was observed for pH 12.7 and pH 10.8. The clarification of the pH 12.7 slurry after 24 hours settling was greater than that achieved for the pH 10.8 slurry after 48 hours settling. Thus, a higher quality clarified liquid could be obtained for the pH 12.7 stripping solution with reduced concentration of solid residue compared to the pH 10.8 clarified liquid under equal conditions.

Comparative stripping solutions #1 and #2 were prepared according to U.S. Pat. No. 5,366,998. Comparative solution #1 (example 41) is reported in U.S. Pat. No. 5,366,998 to result in unsatisfactory film quality. Comparative stripping solution #2 (example 42) was example 41 with reducing sugar added and it was reported to increase the removal of the adhesive layer compared to Comparative solution #1.

In the stripping procedure employed in comparative samples E to J the pH of the stripping solution was adjusted with sulfuric acid addition just prior to the initial flake/liquid separation. The stripping and rinsing conditions were identical to those used in Samples A to D except for the surfactants used.

Comparative Stripping Solution #1

U.S. Pat. No. 5,366,998 Example 41

| | | | Rinse | | | | | | |
|---|---|---|---|---|---|---|---|---|---|
| Sample | pH | Grade | NR | R1 | R2 | R3 | R4 | R5 | R6 |
| E | 12.2 | film | 6.0 | 5.0 | 4.0 | 3.5 | 3.5 | 3.0 | 3.0 |
| F | 8.7 | film | 4.5 | 3.5 | 3.5 | 3.0 | 3.0 | 3.0 | 2.0 |
| G | 6.5 | film | 5.0 | 4.0 | 3.5 | 3.5 | 3.0 | 3.0 | 2.5 |

Comparative Stripping Solution #2

U.S. Pat. No. 5,366,998 Example 42

| | | | Rinse | | | | | | |
|---|---|---|---|---|---|---|---|---|---|
| Sample | pH | Grade | NR | R1 | R2 | R3 | R4 | R5 | R6 |
| H | 11.8 | film | 6.0 | 5.0 | 4.0 | 3.5 | 3.5 | 3.0 | 3.0 |
| I | 8.9 | film | 4.5 | 4.0 | 3.5 | 3.5 | 3.0 | 3.0 | 2.5 |
| J | 6.7 | film | 5.0 | 4.0 | 3.5 | 3.5 | 3.0 | 2.5 | 2.0 |

It was noted that stripping solution #2 did not produce a film grade below 2.0 in six rinses regardless of adjustment of the stripping solution pH prior to separation of the stripped flake.

EXAMPLE 3

The efficiency and effectiveness of rinsing solid residue from stripped flake formed from undeveloped ("green") DuPont UVL medical x-ray film was determined with and without surfactant added to the stripping solution.

The adhesive coating and overlying emulsion layer were stripped from 650 gms of 0.75 inch flake for 30 minutes at 92° C. to 93° C. using 2 liters of 1.5 wt % sodium hydroxide (24 wt % flake loading) and surfactants contained in the stripping solution as indicated in the tables. The effect of pH on surfactant rinse efficiency was examined by neutralizing the stripping solution with sulfuric acid to the indicated pH prior to removal of the flake. Rinses R1 to R6 each employed 1.2 liters of water at 70° C. with quality of the rinsed flake reported as a function of rinse step.

Surfactant: None

| | | Rinse | | | | | | |
|---|---|---|---|---|---|---|---|---|
| pH | grade | NR | R1 | R2 | R3 | R4 | R5 | R6 |
| 13.5 | Film | 6.0 | 5.0 | 4.0 | 3.5 | 3.0 | 3.0 | 3.0 |
| | Silver | 7.0 | 6.0 | 4.5 | 4.0 | 4.0 | 3.5 | 3.0 |

Surfactant: 0.1% Afilan CVH and 0.1 wt % Sulfonate OA-5R

| | | Rinse | | | | | | |
|---|---|---|---|---|---|---|---|---|
| pH | grade | NR | R1 | R2 | R3 | R4 | R5 | R6 |
| 13.5 | film | 6.0 | 5.0 | 4.0 | 2.5 | 1.5 | 1.5 | 1.5 |
| | silver | 7.0 | 6.0 | 4.0 | 2.0 | 2.0 | 1.5 | 1.5 |
| 12.5 | film | 5.5 | 4.0 | 3.0 | 2.5 | 1.5 | 1.0 | 1.0 |
| | silver | 6.0 | 5.0 | 3.0 | 2.0 | 2.0 | 2.0 | 1.5 |
| 9.5 | film | 5.0 | 4.0 | 3.0 | 2.0 | 1.5 | 1.5 | 1.5 |
| | silver | 6.0 | 5.0 | 3.0 | 2.0 | 2.0 | 2.0 | 1.5 |
| 7.0 | film | 6.0 | 5.0 | 4.0 | 3.0 | 2.0 | 1.5 | 1.5 |
| | silver | 7.0 | 5.0 | 4.0 | 2.0 | 2.0 | 2.0 | 2.0 |

-continued

| pH | grade | NR | R1 | R2 | R3 | R4 | R5 | R6 |
|---|---|---|---|---|---|---|---|---|
| 3.2 | film | 7.0 | 5.0 | 4.0 | 3.0 | 2.0 | 2.0 | 2.0 |
| | silver | 7.0 | 7.0 | 5.0 | 3.0 | 2.0 | 2.0 | 2.0 |

Surfactant: 0.1 wt % Triton QS-44 and 0.1 wt % Triton N-111

| pH | grade | NR | R1 | R2 | R3 | R4 | R5 | R6 |
|---|---|---|---|---|---|---|---|---|
| 13.0 | film | 6.0 | 5.0 | 4.0 | 2.5 | 2.0 | 1.5 | 1.5 |
| | silver | 7.0 | 5.0 | 4.0 | 3.0 | 2.0 | 2.0 | 2.0 |

Surfactant: 0.1 wt % Aerosol NPES 458

| pH | grade | NR | R1 | R2 | R3 | R4 | R5 | R6 |
|---|---|---|---|---|---|---|---|---|
| 13.2 | film | 6.0 | 5.0 | 4.0 | 3.5 | 2.5 | 2.0 | 2.0 |
| | silver | 5.0 | 3.0 | 3.0 | 2.0 | 1.5 | 1.5 | 1.5 |

Rinse effectiveness, the ability to remove the solids residue, was poor when no surfactant was added to the stripping solution. The film grade and silver grade attained after six rinse steps was only 3.0.

The rinse efficiency, the number of rinses required to reach an adhesive coating grade 1.5 or below was improved for stripping solutions with the surfactant present.

The stripping solutions with surfactant containing 1.5 wt % sodium hydroxide clarified (i.e., undissolved solids settled) after 1 hour.

As in Example 2, a comparative stripping solution was prepared following U.S. Pat. No. 5,366,998 (in this case Example 8 of the patent).

The silver and adhesive coatings were stripped from the flake at a pH of 13.1 and then the pH of the slurry was lowered to the indicated pH before the initial flake/liquid separation.

COMPARATIVE EXAMPLE

U.S. Pat. No. 5,366,998 Example 8 with surfactants from Example 1

Comparative Stripping Solution #3

| pH | grade | CR | R1 | R2 | R3 | R4 | R5 | R6 |
|---|---|---|---|---|---|---|---|---|
| 13.1 | film | 6.0 | 5.0 | 4.0 | 3.5 | 3.0 | 2.5 | 2.0 |
| | silver | 6.0 | 4.0 | 2.5 | 2.0 | 2.0 | 1.5 | 1.0 |
| 12.5 | film | 6.0 | 5.0 | 4.0 | 3.0 | 3.0 | 2.0 | 2.0 |
| | silver | 6.0 | 4.0 | 2.5 | 2.0 | 2.0 | 1.0 | 1.5 |
| 10.1 | film | 5.0 | 4.0 | 3.5 | 3.0 | 2.5 | 2.5 | 2.0 |
| | silver | 7.0 | 5.0 | 3.0 | 3.0 | 2.5 | 2.0 | 2.0 |
| 8.7 | film | 5.0 | 4.0 | 3.5 | 3.0 | 2.0 | 2.0 | 1.5 |
| | silver | 7.0 | 5.0 | 3.0 | 3.0 | 2.5 | 2.0 | 2.0 |
| 6.5 | film | 7.0 | 4.0 | 3.5 | 3.0 | 2.5 | 2.0 | 2.0 |
| | silver | 7.0 | 6.0 | 3.5 | 3.5 | 3.0 | 2.0 | 2.0 |
| 3.0 | film | 7.0 | 5.0 | 4.0 | 3.5 | 2.5 | 2.5 | 2.5 |
| | silver | 7.0 | 6.0 | 4.0 | 3.5 | 3.0 | 2.5 | 2.5 |

It was noted that stripping solution #3 remained substantially unclarified after 24 hours of settling.

EXAMPLE 4

This example illustrates the ability of stripping solutions of the present invention to strip film employing recycle liquid.

800 grams of 0.5 inch flake from DuPont undeveloped ("green") UVL medical x-ray film was stripped for one hour at 90° C. using a stripping solution of 1.5 wt % sodium hydroxide in 2.0 liters of water containing 1.1 gm of Afilan CVH and 0.9 grams of Sulfonate OA-SR. The stripped flake was separated from the stripping solution without neutralization and successively rinsed and drained using one liter of water at 70° C. for each rinse step.

The used stripping solution was collected and 80 volume % was recycled to strip a second batch of flake with 20 vol % of a make-up stripping solution containing 0.55 wt % Afilan and 0.45 wt % of Sulfonate OA-5R with 25 grams of a 50% sodium hydroxide (the slightly higher amount of sodium hydroxide was required to maintain the pH of the stripping solution at 13.6 compensating for hydroxide ion consumed during the stripping process, presumably in the reduction of silver ion to silver).

Two parallel runs were made at the 80% recycle of stripping solution: a first run without clarification of the stripping solution in which the stripping solution was mixed immediately before charging the recycle portion to avoid clarification and a second run in which the stripping solution was clarified by settling for one hour after which the clarified liquid was decanted and used as the recycle portion. The clarified stripping solution thus contained approximately a constant level of solids residue with successive recycle steps (although the dissolved solids content increased) while the unclarified recycle stripping solution steadily increased in concentration of both solid residue as well as dissolved solids during successive recycle steps. After stripping for an hour at 90° C., the second stripped flake was drained and the stripping solution collected for recycle and so forth.

A comparison of film grade of the initial flake batch (1st) stripped and the four batches of flake (2nd through 5th) stripped using recycled stripping solution is presented in the following tables.

80% recycle of unclarified stripping solution

| Batch | Grade | R1 | R2 | R3 | R4 | R5 | R6 |
|---|---|---|---|---|---|---|---|
| 1st | Film | 4.0 | 3.0 | 2.0 | 1.5 | 1.0 | 1.0 |
| | Silver | 5.0 | 3.0 | 3.0 | 2.0 | 2.0 | 1.0 |
| 2nd | Film | 5.0 | 4.0 | 3.0 | 2.0 | 1.5 | 1.0 |
| | Silver | 6.0 | 4.0 | 3.0 | 2.0 | 2.0 | 2.0 |
| 3rd | Film | 6.0 | 5.0 | 3.0 | 2.5 | 2.0 | 1.5 |
| | Silver | 7.0 | 4.0 | 3.0 | 2.0 | 2.0 | 2.0 |
| 4th | Film | 6.0 | 5.0 | 3.5 | 3.0 | 2.0 | 1.5 |
| | Silver | 7.0 | 4.0 | 3.0 | 3.0 | 2.0 | 2.0 |
| 5th | Film | 6.0 | 5.0 | 4.0 | 3.5 | 2.5 | 1.5 |
| | Silver | 7.0 | 5.0 | 4.0 | 3.0 | 3.0 | 3.0 |

80% recycle of clarified stripping solution

| Batch | Grade | R1 | R2 | R3 | R4 | R5 | R6 |
|---|---|---|---|---|---|---|---|
| 1st | Film | 4.0 | 3.0 | 2.0 | 1.5 | 1.0 | 1.0 |
| | Silver | 5.0 | 3.0 | 3.0 | 2.0 | 2.0 | 1.0 |

-continued

| Batch | Grade | Rinse | | | | | |
|---|---|---|---|---|---|---|---|
| | | R1 | R2 | R3 | R4 | R5 | R6 |
| 2nd | Film | 4.0 | 3.0 | 2.0 | 1.5 | 1.0 | 1.0 |
| | Silver | 5.0 | 3.0 | 2.0 | 2.0 | 2.0 | 1.0 |
| 3rd | Film | 5.0 | 4.0 | 3.0 | 2.0 | 1.5 | 1.0 |
| | Silver | 6.0 | 3.0 | 3.0 | 2.0 | 2.0 | 1.0 |
| 4th | Film | 5.5 | 4.5 | 3.0 | 2.0 | 2.0 | 1.5 |
| | | 6.0 | 3.0 | 3.0 | 2.0 | 2.0 | 1.0 |
| 5th | Film | 6.0 | 5.0 | 3.5 | 2.5 | 2.0 | 1.5 |
| | Silver | 6.0 | 4.0 | 3.5 | 3.0 | 2.0 | 2.0 |

This example demonstrated that stripping could be accomplished with up to 80 volume % recycle. The value of clarification to remove solids residue from the stripping solution was evidenced particularly in the increased silver grade for flake washed with the unclarified recycle in comparison to the clarified recycle. The rinse effectiveness for flake stripped using the unclarified stripping solution was degraded by carryover of the silver particles even in the first recycle. The difficulty in removal of the silver increased with successive batches of flake processed since the concentration of solid residue increased in the stripping solution with each recycle due to the lack of clarification.

EXAMPLE 5

This example demonstrates stripping multiple batches of flake using a stripping solution comprising 50 volume % recycle of clarified slurry. It further demonstrates increased rinse efficiency through addition of surfactant to the rinse.

Part A

Coating layers were stripped from 800 grams of 0.75 inch flake formed from DuPont undeveloped ("green") UVL medical x-ray film by mixing 2 liters of stripping solution comprising 1.0 wt % of sodium hydroxide with 0.11 wt % Afilan CVH and 0.09 wt % Sulfonate OA-5R for an hour at 92° C. to 93° C. The flake was separated from the stripping solution without neutralization and drained. The flake was successively rinsed by mixing the flake with the water (and optionally surfactants as specified) at 70° C. after which the flake was separated from the rinse retaining a 10 gram flake sample and the rinse solution from each rinse step. The film grade of the retained flake was evaluated for adhesive coating and silver following each rinse step as indicated in the following tables.

No surfactant added to rinse

| Grade | Rinse | | | | | |
|---|---|---|---|---|---|---|
| | R1 | R2 | R3 | R4 | R5 | R6 |
| Film | 5.0 | 4.0 | 3.0 | 1.5 | 1.0 | 1.0 |
| Silver | 5.0 | 3.0 | 2.0 | 2.0 | 1.0 | 1.0 |

The film quality was excellent with film grade 1.0 after the fifth and sixth rinse steps.

Part B

A second batch of 800 gms of DuPont UVL medical X-ray film formed into flake was stripped in 2 liters of a second stripping solution. The stripping solution constituted a liter of clarified stripping slurry from Part A, 800 gms of clarified first rinse solution from Part A flake, and 200 grams of clarified second rinse solution from Part A flake, 0.66 gms of Afilan CVH and 0.55 grams of OA-5R sulfonate surfactants and 20 grams of a 50% NaOH. Only about a third of the amount of additional surfactant and half of the amount of additional sodium hydroxide were required to be added to the recycled solutions to achieve equivalent levels of sodium hydroxide and surfactants in the second stripping solution as in the Part A stripping solution.

After stripping the flake, the flake was separated from the stripping solution (which was retained for subsequent use) and the drained flake was successively rinsed at 70° C. after which the flake was separated and drained, retaining a 10 gram flake sample and the rinse solution at each rinse step.

The stripped flake was subjected to a first rinse step using a first rinse mixture constituting 0.5 liters of clarified rinse solution retained from the second rinse used for Part A and 0.6 liters of clarified solution retained from the third rinse of Part A. The flake was subjected to a second rinse step using a second rinse mixture constituting 0.4 liters and 0.6 liters of the third and fourth rinse solutions respectively from Part A. The flake was then subjected to a third rinse step using a third rinse mixture constituting 0.3 liters and 0.7 liters of the fourth and fifth rinse solutions respectively of Part A. The flake was then subjected to a fourth rinse step using a fourth rinse mixture constituting 0.2 liters and 0.8 liters from the fifth and sixth solutions respectively from Part A. The flake was subjected to fifth and sixth rinses each of which utilized one liter of water.

Parts C & D

Two more batches of flake were similarly stripped using similar proportions of clarified stripping slurry and rinse solutions from the previous recycle.

The data for Part D are as follows based on no surfactant added to the rinse water.

| Grade | Rinse | | | | | |
|---|---|---|---|---|---|---|
| | R1 | R2 | R3 | R4 | R5 | R6 |
| Film | 6.0 | 5.0 | 3.5 | 2.0 | 2.0 | 1.5 |
| Silver | 5.0 | 4.0 | 2.0 | 2.0 | 2.0 | 2.0 |

The data showed degradation of rinsed flake quality due to the buildup of solids in the stripping solution. This limitation occurred earlier than anticipated based on the 80% recycle data from the previous example due to the added solids load in the rinsing liquids. The lower caustic concentration (1.0 wt % vs 1.5 wt % previous examples) of the stripping solution slowed the rate of clarification prior to decantation resulting in proportionally more solids in the clarified liquid which were then added into the subsequent stripping solution.

Parts E & F

To demonstrate the advantages of adding surfactant to the rinse, two further batches of flake were stripped and rinsed according to the process described above but with the addition of surfactant to the rinse in the amount of 0.27 gm of Afilan CH and 0.23 gm Sulfonate OA-5R to the first rinse liquid and the addition of 0.55 gm of Afilan CVH and 0.45 gm Sulfonate OA-5R to the second rinse liquid.

The data are as follows:

|       | Rinse |     |     |     |     |     |
|-------|-------|-----|-----|-----|-----|-----|
| Grade | R1    | R2  | R3  | R4  | R5  | R6  |
| Film  | 5.0   | 4.0 | 3.0 | 2.0 | 1.5 | 1.0 |
| Silver| 5.0   | 3.0 | 2.0 | 2.0 | 2.0 | 1.0 |

Stripped flake having both a film grade and silver grade of 1.0 was still obtained at the sixth rinse. The use of added surfactant in the rinse step counteracted the trend towards lower flake quality due to increased solids in the stripping solution from recycle streams.

What is claimed is :

1. A process for removal of an adhesive coating layer from polyester film comprising the steps of:

(a) forming coated polyester film into a series of flakes, (b) contacting the flakes with an aqueous alkaline stripping solution (i) having a pH of at least 12 and (ii) comprising a surfactant whereby the adhesive coating is removed from the polyester to obtain stripped polyester flake, (c) separating undissolved solids from step (b) to recover separately stripped polyester flake and a slurry comprising stripped solution, surfactant and a dispersed solid residue resulting from the adhesive coating layer with the proviso said surfactant chosen such that the stripped separated polyester flake has surface contamination of at least 360 parts per million based on the weight of the contaminated and stripped dry flake, (d) rinsing the stripped polyester flake from step (c) having said surface contamination of at least 360 parts per million with an aqueous rinse stream, whereby the flake has surface contamination of not greater than 36 parts per million based on the weight of the contaminate and stripped dry polyester flake and with the further proviso that stripped polyester flake when rinsed with repeated six times results in a polyester flake having a surface contamination of not greater than 28 parts per million based on the weight of the contaminate and stripped dry polyester flake.

2. The process of claim 1 including the added steps of (e) separating the slurry into a clarified liquid and a concentrate, and (f) repeating steps (a) through step (d) on additional flake with at least a portion of the clarified liquid from step (e) recycled into step (b).

3. The process of claim 1 wherein step (a) through step (d) is repeated with a portion of the slurry for step (c) recycled into step (b).

4. The process of claims 2 or 3 wherein additional alkali is added to the slurry prior to step (e).

5. The process of claims 1, 2 or 3 wherein surfactant is added in the aqueous rinse of step (d).

6. The process of claims 1, 2 or 3 wherein additional alkali is added in the aqueous rinse of step (d).

7. The process of claims 1, 2 or 3 wherein additional alkali and surfactant(s) are added in the aqueous rinse step (d).

8. The process of claims 1, 2 or 3 wherein the surfactant has a maximum rinse efficiency in the pH range 9 to 12 and a maximum rate of slurry clarification in the pH range of 12 to 14.

* * * * *